May 14, 1957
G. H. CHENEY
2,791,905
FLOW ANGLE PROBES FOR WIND TUNNELS
Filed July 19, 1954
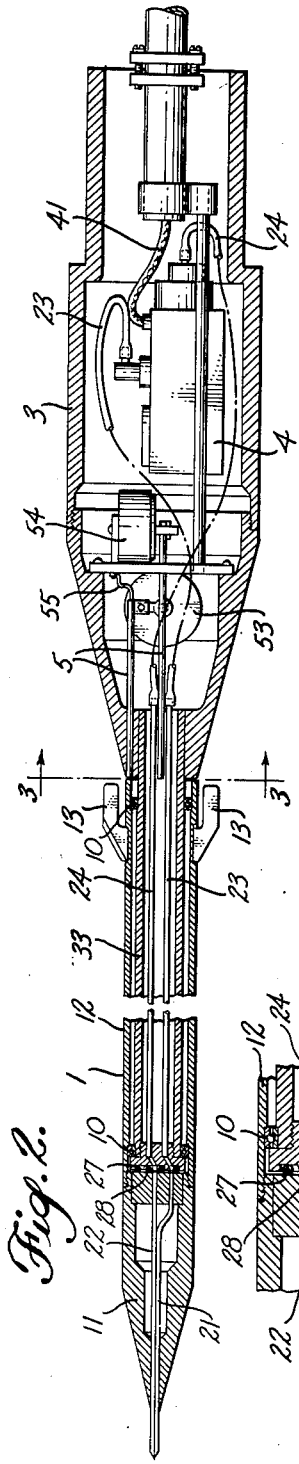
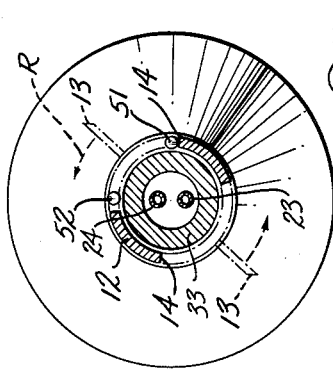
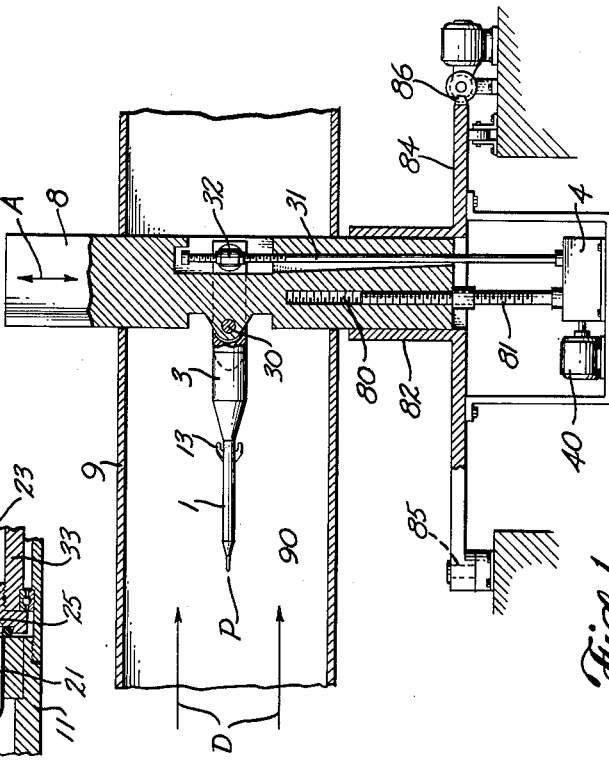
INVENTOR.
GORDON H. CHENEY
BY Reynolds, Beach & Christensen
ATTORNEYS { # United States Patent Office

2,791,905
Patented May 14, 1957

2,791,905

FLOW ANGLE PROBES FOR WIND TUNNELS

Gordon H. Cheney, Seattle, Wash., assignor to Boeing Airplane Company, Seattle, Wash., a corporation of Delaware Application July 19, 1954, Serial No. 444,059

12 Claims. (Cl. 73—188)

In wind tunnel operations it is necessary to determine with exactness the angle at which a given part or surface of a model is presented with relation to the airflow through the tunnel. The determination of such angles in a vertical plane with accuracy is more necessary than the accurate determination of such angles in a horizontal plane, yet the accuracy of the horizontal determinations may become an important factor, and even if not important per se, the horizontal determinations are sometimes of importance because of their bearing as a check upon the accuracy of the vertical determinations. To such ends it is necessary to ascertain the precise direction of airflow through the tunnel (at least in the vertical plane) at a given point, as a datum. The present invention is concerned with the determination of the direction of airflow through such a wind tunnel at a selected point or at selected points in the wind tunnel.

The present invention is especially designed for use in conjunction with the wind tunnel model support disclosed in the copending application of Philip C. Whitener, Serial No. 456,576, filed September 16, 1954. The present device is usable also on airplanes in flight as a pitch and/or yaw indicator, or as the sensing means to actuate devices for automatic control of pitch angle and/or yaw angle.

In either usage, in wind tunnel operations or on an airplane in flight, this device is designed to enable sensing of both pitch and yaw angles, and alternately, each thereof, by a single instrument which incorporates a differential pressure sensitive head mounted for continuous rotation, although preferably by successive 90° steps, always in a single rotative sense. By enabling continuous rotation of the sensing head in the single rotative sense, rather than rotation of less than 360° (usually not appreciably more than 90°) and then reversal of the sense of rotation for a like limited extent, the present device differs from similar devices known to me.

Primarily the present device has been designed for use in wind tunnel operations, and will be described in connection with the same, always bearing in mind its applicability to flight operations and indications, as stated immediately above, and as will be well understood by those skilled in this art. The specific references herein to wind tunnel operations are for the purposes of illustration, and are not intended as restrictive.

Broadly speaking, the direction of airflow is determined by a pressure comparing and indicating means, such as includes a plurality of pressure-sensing elements located at the forward end of a probe which is mounted in the wind tunnel, and which pressure-sensing elements are spaced angularly about the axis of the probe. The pressure-sensing elements are caused to rotate, normally step by step through 90° intervals, and continuously in one rotative sense, about the probe's longitudinal axis, and the pressures sensed by these individual elements are communicated to the pressure comparing means and thence to the indicator. The probe is so mounted that it is adjustable in angle, preferably about a center which approximately coincides with the forward end of the probe, where the pressure-sensing elements are located. Its adjustment proceeds until the pressure-sensing elements and the indicator affected thereby disclose that the probe is in alignment with the direction of airflow. This indication comes as a result of comparison of the pressures sensed by these elements in the several rotated positions, and the indication, as a result of such sensing, that there is an absence of any pressure difference between these elements. When the probe, by its adjustment, has reached such a position as to indicate an absence of any pressure difference between the pressure-sensing elements in their several rotated positions, it becomes clear that the axis of rotation of the probe points in the direction of airflow. The attained position of the probe can either be indicated by a scale on the support, or can be measured with relation to the support, to indicate the angle in space (or the vertical angle, if pitch angle is the one of principal interest) of the airflow direction at the point represented by the forward end of the probe.

One of the necessary conditions to the determination above is that the probe be rotatable about an axis more or less coinciding with the direction of airflow through a number of successive rotated positions, and in practical effect that it be halted in each of these angularly rotated positions about its axis for the purpose of determining, in each such rotated position, the presence or absence of a pressure difference at the probe's tip. Angular rotation through 180° intervals might be sufficient if only the pitch angle need be determined, but since determination or an approximation of the yaw angle may be desirable, and since even in the determination of pitch angle it may be desirable to check pressure differences at 90° intervals, in order to determine if the same difference exists in all four such positions (in which case it might indicate an injury to or inaccuracy in the pressure head and one or both its two pressure sensitive elements), 90° steps are preferably provided for. The present invention has particular reference to the mechanism for permitting and effecting rotation of the probe continuously in a single rotative sense into these several angularly related positions in succession, and the halting of the probe in each such position long enough to effect the determination of whether or not there is a pressure difference between the angularly disposed pressure-sensing elements, of which there are normally two, diametrically disposed with relation to the axis of rotation.

In a more specific sense the present invention concerns a probe of the general nature indicated, incorporating a rotative element and a nonrotative base, the rotative element incorporating at least two angularly related pressure-sensing elements, normally in the form of two conduits, the forward tips of which are beveled alike relative to, but angularly (diametrically, of only two) spaced about the axis of rotation, together with pressure comparing and indicating means normally supported in part at least in the nonrotative base, which are operatively connected by pressure conduits to the rotative pressure-sensing tips on the probe. Rotation of the probe is accomplished by means of helically arranged vanes outstanding from the probe into the airflow, and the probe is stopped in the several angularly rotated positions by stop means including two alternatively located stop elements carried by the probe and two complemental stop means angularly related, and carried by the probe. The necessity of transmitting pressures from the rotative probe to the nonrotative base, and thence to the pressure comparing and indicating means, requires a rotative seal and pressure transmission device of a special nature at the junction between the probe and the nonrotative support or base therefor. It is not essential that the pressure comparing } and indicating means be carried upon the base, but it is convenient so to mount them, or at least certain parts thereof, for example the pressure comparing element, in which case the indicating means may be located elsewhere, more conveniently for reading.

Since it is desirable that the probe, and in particular its pressure-sensing elements, be adjustable about an approximate center, the probe, according to the present invention, is mounted upon a columnar support which is directed transversely of the wind tunnel, and which has means for adjusting it and the probe relatively and conjunctively in such manner as to effect the adjustment of the probe, either bodily or conjointly, and by any selected relative amount, and in any direction transversely of the wind tunnel.

The provision of mechanism to the above ends is the primary object of the present invention, and the mechanism by which these ends are carried out will be better understood from the accompanying drawings wherein the invention is shown in a preferred embodiment, and fully from the following specification and from the claims which terminate the same.

Figure 1 is in general a longitudinal sectional view through a wind tunnel, and through the columnar support, showing the probe in elevation, and illustrating all parts in a diagrammatic fashion.

Figure 2 is a longitudinal axial sectional view through the probe and its supporting base.

Figure 3 is a transverse sectional view approximately along the line and from the viewpoint indicated at 3—3 in Figure 2.

Figure 4 is an enlarged axial sectional view of the sealing arrangement intermediate the facing surfaces of the rotative probe and the nonrotative base.

In Figure 1, which is almost wholly diagrammatic, the wind tunnel walls are represented at 9, defining a throat 90, through which air flows in the direction of the arrows D, and within which a model is to be supported from a main columnar support, indicated at 8, which is directed transversely of the wind tunnel 9. It is necessary to ascertain the direction of airflow at a point P which bears some definite relation to the model subsequently to be supported in the throat 90. A nonrotative elongated base 3 is pivotally supported at 30 from the columnar support 8 to tilt about an axis which is directed transversely of the throat and transversely of the direction of adjustment of the columnar support 8, indicated by the arrow A. The probe 1 is rotative about its longitudinal axis upon and with relation to the base 3, in a manner which will be explained hereinafter. Adjustment of the main support 8 in the direction indicated by the arrow A is accomplished, as diagrammatically shown, by rotation in one rotative sense or the other of a jack screw 81 threaded at 80 within the column 8, the column being guided within a guide 82 on a platform 84. Like adjustment of the probe 1 and its base 3, with or without its tilting about the pivot axis at 30, is similarly accomplished by rotation in one sense or the other of a screw 31 threaded within a nut 32 on the base 3 at a point offset at some selected moment arm from the pivot axis at 3. By joining the screws 81 and 31 through an infinitely variable differential drive, such as a Waterbury hydraulic gear, indicated at 4, and driven from a motor 40, it is possible to effect rotation of these two screws 81 and 31 at a rate to move the column 8 and the probe 1 through positions wherein the probe's axis is parallel to itself, or by differential rotation of the screws 81 and 31, to effect tilting of the axis of the probe while maintaining its forward tip substantially at the point P. There will be some slight longitudinal movement of the tip of the probe, but its tip can be made to remain approximately at the center P. The manner in which this can be accomplished is more fully explained in the Whitener application referred to above.

Since it is sometimes desirable to effect adjustment of the elements with relation to the point P as an approximate center, in a direction transverse to the length of the columnar support 8, this may be accomplished by rotating the table 84, which also supports the transmission 4, about a center at 85, the axis of which coincides with the point P, through the worm and sector gearing indicated at 86.

It will be understood that the mounting and means of adjustment for the probe are only diagrammatically shown, as representative of any practical adjusting means to the ends indicated above, and that it is not intended to restrict the adjusting means to those illustrated and described.

The probe 1 is elongated and more or less streamlined in shape, and is journaled for rotation about a barrel 33 which projects forwardly from the base 3. Combined rotative and thrust bearings are indicated at 10. The rotative probe includes a forward head 11 and a rearwardly directed skirt 12 surrounding the barrel 33. In the forward head 11 are provided two or more (and preferably only two) pressure conduits 21 and 22, terminating in similarly but oppositely beveled tips at the forward end of the probe portion 11, and terminating rearwardly in ports, one of which, the port corresponding to the conduit 22, is arranged in the rotative axis, and the other, corresponding to the conduit 21, is located radially outward of the rotative axis. Extensions of these conduits, at 23 for the conduit 21, and at 24 for the conduit 22, extend through the barrel 33 and terminate at their forward end in a port 25 corresponding to the conduit extension 23, and a port 26 corresponding to the conduit extension 24 (see Figure 4). Communication is established between the rear ports of the conduits 21, 22 and the corresponding parts 25, 26 in the nonrotative barrel 33, and cross-communication is prevented, through the intermediary of an inner sealing ring 28 which surrounds the rear end of the conduit 22 and the axially located port 26, and a second and larger sealing ring 27, which surrounds the rear port of the conduit 21 and the forward port 25 of the conduit 23. The sealing rings 27 and 28 define an annular space between them, which constitutes the communication between the conduit 21 and port 25, whereas communication between the conduit 22 and port 26 is constituted by the space within the inner sealing ring 28.

The conduit extensions 23 and 24 lead rearwardly through the base 3 of the probe to a connection with a pressure comparing device indicated at 4 in Figure 2, of known type, which converts a pressure difference, if it exists, into an electrical signal through the lead 41, and such electrical signals are impressed upon an indicator (not shown) of any suitable or known type located conveniently to an absorber, who can thereby tell at a glance whether there exists a pressure difference between the tips of the conduits 21 and 22 in any given rotated position of the latter.

Rotation of the probe 1 is readily accomplished by the provision of helical vanes 13 outstanding from the probe into the airflow, and arranged to effect rotation of the probe continuously in a single rotative sense (arrows R, Figure 3), with relation to the base 3. Since it is desired to stop the probe in each of several rotated positions, preferably at 90° intervals, the rear end of the skirt 12 of the rotative probe is formed with two stop shoulders 14 at 180° spacings, and two complemental stops 51 and 52 are provided at 90° spacings, preferably in the form of push-pull rods 5. These rods, projectable longitudinally within the base 3 under the influence of springs 55, are arranged to engage alternatively one or the other of the stops 14. Alternative reciprocation of the rods may be controlled or effected by the solenoids, 53 to control the stop 51, and 54 to control the stop 52, together with switching mechanism (not shown) which will energize the solenoids 53, 54 alternately to effect retraction of the corresponging stops.

Thus, assuming neither solenoid 53 nor 54 to be energized, both stops 51, 52 are projected by their springs 55, and one or the other (51 in Figure 3) engages a stop 14 and prevents rotation of the probe in the sense indicated by the arrows R. Energization of solenoid 53 retracts stop 51, and the probe rotates until that same stop 14 engages the still projected stop 52, halting the rotation after 90°. Subsequent energization of solenoid 54 retracts the stop 52, but since deenergization of solenoid 53 accompanies or precedes energization of 54, stop 51 is in projected position to halt the following stop 14 after 90° of rotation. This permits rotation of the beveled tips of the conduits 21, 22 through ninety-degree rotated positions, to sense the presence or absence of a pressure difference, in the manner already indicated, in each such position. By effecting adjustment of the angle of the probe's axis of rotation, as already described, in accordance with the indications thus obtained it is possible to locate the rotative axis of the probe in the direction of airflow with great exactness, whereupon, as already stated, the angular position of the probe can be determined, thus determining the direction of the airflow.

It will be understood that the probe and its base can be selected of such length that the direction of airflow at any point, close to or distant from the main support 8, is readily determinable. Also, the axis of the probe and its base can be offset from the plane of the main support 8, to determine the direction of air flow nearer one side of the throat 90 than the other side thereof.

As has been indicated hereinbefore, the patch angle—the angle in a vertical plane—usually must be determined quite accurately. If the pressures at the tips of conduits 21 and 22 are equal with 22 above 21, and are equal with the locations of these conduits altered by 180°, it can be assumed that the axis of rotation coincides with the airflow direction. This would imply that rotation through 180° intervals would adequately serve the user's needs, unless he wishes also to determine the yaw angle—the angle in a horizontal plane. If, however, a difference of pressure is indicated in the first such position, but rotation through 180° indicates the same pressure difference, and it is not possible to obtain an indication of zero pressure difference in either such position, this is likely to indicate a lack of uniformity between the tips, due to manufacturing inaccuracy or to injury. On the other hand, it could indicate a disturbing factor due to airflow which is divergent in azimuth from the wind tunnel's axis. If the same two tips are presented side by side laterally, and are rotated 180° to the reversed side by side position, and if the same pressure difference is indicated in each such position, it can be certain that the sensed difference is in fact due to an inaccuracy, and that the rotative axis does in fact coincide with the airflow direction, notwithstanding the indicated pressure difference in the several positions. Thus the ability to stop rotation in each 90° position furnishes a check on the accuracy of the overall indication regardless of inaccuracy in the pressure-sensing elements.

I claim as my invention:

1. An airflow directional indicator comprising a barrel extending generally in the direction of airflow, a probe mounted on said barrel for unlimited rotation about an axis coincident with the extent of the barrel, means to rotate said probe in a single continuous sense about such axis, pressure comparing and indicating means including a plurality of pressure-sensing elements located at the forward end of the probe and spaced angularly about its rotative axis, and including also an indicator operatively connected to the pressure-sensing elements to indicate the presence or absence of a pressure difference sensed by the said elements in different positions rotated about the probe's axis, and means to position the probe, during its rotation, successively in each of a plurality of selected and angularly related positions about the rotative axis, in order to obtain individual indications, in each such position, of pressure difference, if any, for comparison with like indications in angularly related positions.

2. An airflow directional indicator as defined in claim 1, including means to adjust the barrel bodily angularly to adjust its extent, and the direction of the axis of rotation, relative to the actual direction of airflow.

3. An airflow directional indicator as in claim 1, wherein helically disposed vanes outstanding from the probe into the airflow constitute the probe-rotating means.

4. An airflow directional indicator as in claim 1, wherein the pressure-sensing elements include a plurality of conduits extending through the probe and each terminating in a tip opening forwardly at the probe's forward end, the several tips being spaced angularly about the rotative axis and being beveled alike each relative to that axis, and a pressure comparing means operatively connected to said tips and to the indicating means.

5. A device to determine the precise direction of airflow through a wind tunnel comprising an elongated probe disposed in the general direction of such airflow, means supporting said probe for rotation about its longitudinal axis through successive predetermined and relatively angularly spaced positions, means so to rotate the probe, pressure comparing and indicating means including a plurality of pressure-sensing elements located at the forward end of the probe and spaced about its rotative axis, the pressure comparing and indicating means including also an indicator operatively connected to the pressure-sensing elements to indicate the presence or absence of a pressure difference sensed by said elements in the several rotated positions of the probe, and means to tilt the probe about its forward end as an approximate center, to bring the pressure-sensing elements into relative positions of equal pressure in their several rotated positions, and so to locate the probe's axis in alignment with the dierction of airflow.

6. A flow angle probe as in claim 5, including means to halt rotation of the probe in each of its several rotated positions, pending indication of the presence or absence of a pressure difference in each such position.

7. A flow angle probe as in claim 5, including a support for the probe extending transversely to the direction of airflow, means to adjust the position of said support transversely of the direction of airflow, and of the probe with and also relatively to the support, the whole constituting the means to tilt the probe.

8. A flow angle probe as in claim 7, including means to adjust the support and the support and probe adjusting means bodily angularly about an axis parallel to the extent of the support and including the probe's forward end.

9. A device to determine the direction of airflow through a wind tunnel, comprising an elongated probe disposed in the general direction of the airflow, means supporting said probe for rotation about its longitudinal axis through successive angularly rotated positions, means so to rotate the probe, a plurality of conduits extending through said probe and each terminating in a pressure-sensing tip opening forwardly at the forward end of the probe, and each beveled alike with relation to the probe's rotative axis, and the tips being angularly spaced about that axis, a pressure comparing and indicating means operatively connected to said conduits to determine the presence or absence of a pressure difference between their respective tips in their several rotated positions, a support for the probe whereon the same is mounted, means to adjust the position of the support transversely of the direction of airflow and of the probe with and also relatively to the support, to tilt the probe about its forward end as an approximate center, to bring the bevels of the several conduit tips into like angular relationship to the direction of airflow, where they will sense zero pressure difference, and so to bring the probe's rotative axis into alignment with that direction.

10. A flow angle probe as in claim 9, including two stop elements carried by the support and located at 90° spacings, in position to engage the probe, and complemental stop elements carried by the probe and located at 180° spacings, in position to be engaged and stopped by the support-carried stop elements alternatively into engaging position, to permit 90° step by step rotative advance of the probe.

11. A flow angle probe as in claim 9, wherein the pressure comparing and sensing means include two conduits extending through and rotative with the probe, terminating in oppositely beveled tip openings at the forward end of the probe, which constitute the diametrically spaced pressure-sensing elements, and in two ports opening at the inner end face of the probe, two corresponding conduits extending through the support, and terminating in two ports opening at the forward end face of the support, adjacent the loci of the probe's ports, one of the probe's ports being axially disposed and the other being radially outward thereof, and the support's ports being respectively similarly disposed, and two coaxially disposed sealing rings located intermediate the ported end faces of the probe and the support, one surrounding the axially disposed ports but inside the outer ports, and the other surrounding the outer ports.

12. A device to determine the direction of airflow through a wind tunnel comprising an elongated probe disposed in the general direction of such airflow, means supporting said probe for rotation about its longitudinal axis, pressure comparing and indicating means including a pair of pressure-sensing elements located at the forward end of the probe and spaced diametrically about its rotative axis, the pressure comparing and indicating means including also an indicator operatively connected to said pressure-sensing elements, to indicate the presence or absense of a pressure difference sensed by said elements in different positions of the probe rotatively about the axis of rotation, vanes projecting from the probe into the airflow, and helically arranged to effect rotation of the probe, and means to halt rotation of the probe in each of the several positions spaced angularly about its axis of rotation, said means being releasable under control for rotation to the next such position, and means to tilt the probe to dispose its rotative axis in alignment with the direction of airflow, as indicated by the indication of zero pressure difference in the several rotated positions.

References Cited in the file of this patent
UNITED STATES PATENTS

| | | |
|---|---|---|
| 2,343,288 | Fink | Mar. 7, 1944 |
| 2,445,746 | Raspet | July 20, 1948 |
| 2,463,585 | Young | Mar. 8, 1949 |
| 2,515,251 | Morris | July 18, 1950 |
| 2,645,123 | Hundstad | July 14, 1953 |